(12) United States Patent
Kobayashi et al.

(10) Patent No.: US 8,880,261 B2
(45) Date of Patent: Nov. 4, 2014

(54) ELECTRICALLY DRIVEN VEHICLE

(75) Inventors: Hiroyuki Kobayashi, Mito (JP); Akira Kikuchi, Hitachi (JP); Tomohiko Yasuda, Kashiwa (JP); Takayuki Satou, Kashiwa (JP); Kichio Nakajima, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/816,523

(22) PCT Filed: Jul. 29, 2011

(86) PCT No.: PCT/JP2011/067422
§ 371 (c)(1),
(2), (4) Date: Feb. 12, 2013

(87) PCT Pub. No.: WO2012/029476
PCT Pub. Date: Mar. 8, 2012

(65) Prior Publication Data
US 2013/0144480 A1 Jun. 6, 2013

(30) Foreign Application Priority Data
Sep. 2, 2010 (JP) ................................. 2010-196953

(51) Int. Cl.
*B60L 9/00* (2006.01)
*E21B 7/04* (2006.01)
(Continued)

(52) U.S. Cl.
CPC ............. *G06F 17/00* (2013.01); *B60T 2201/04* (2013.01); *B60W 2520/263* (2013.01);
(Continued)

(58) Field of Classification Search
CPC ......... B60W 10/08; B60K 6/52; Y02T 10/06; E21B 47/18; C10M 2219/044; F02N 15/023
USPC ............................. 701/22; 175/61; 340/854.1
See application file for complete search history.

(56) References Cited

U.S. PATENT DOCUMENTS 4,873,638 A * 10/1989 Shiraishi et al. ................. 701/70
5,961,565 A * 10/1999 Kawabe et al. .................. 701/90
(Continued)

FOREIGN PATENT DOCUMENTS

JP 62-265430 11/1987
JP 62265430 A * 11/1987
(Continued)

*Primary Examiner* — Thomas G Black
*Assistant Examiner* — Tyler Paige
(74) *Attorney, Agent, or Firm* — Antonelli, Terry, Stout & Kraus, LLP.

(57) ABSTRACT

An electrically driven vehicle equipped with electric motors (1, 4) for driving or braking drive wheels (3, 6), and an electric motor controller (33) for controlling the electric motors includes: wheel speed detectors (9 to 12) for detecting the wheel speed of the drive wheels and that of idler wheels (7, 8); computing means (22 to 28, 35 to 38) for computing the slip ratio of the drive wheels based on the wheel speed of the drive wheels and that of the idler wheels; and a determiner (29) for determining that the drive wheels are slipping if the slip ratio exceeds a slip ratio determination value. If the wheel speed of the idler wheels is lower than set speeds $Va_2$, $Vb_2$, then the determiner (29) changes the slip ratio determination value to a value having as the same sign as, and a larger absolute value than, the values $\lambda a_2$, $\lambda b_2$ used when the wheel speed of the idler wheels is higher than the set speeds $Va_2$, $Vb_2$. This structure shortens acceleration time during acceleration traveling and reduces braking distance during deceleration traveling while inhibiting vibrations of the electrically driven vehicle.

10 Claims, 6 Drawing Sheets

(51) Int. Cl.
*G01V 3/00* (2006.01)
*B60L 15/20* (2006.01)
*B60T 8/1761* (2006.01)
*B60K 28/16* (2006.01)
*G06F 17/00* (2006.01)
*B60K 7/00* (2006.01)

(52) U.S. Cl.
CPC ......... *B60L 15/20* (2013.01); *B60K 2007/0061* (2013.01); *B60W 2520/28* (2013.01); *B60T 8/17616* (2013.01); *Y02T 10/648* (2013.01); *B60K 7/0007* (2013.01); *Y02T 10/646* (2013.01); *B60K 28/16* (2013.01)
USPC ............................ 701/22; 175/61; 340/854.4

(56) References Cited

U.S. PATENT DOCUMENTS

| | | | |
|---|---|---|---|
| 6,305,760 B1 * | 10/2001 | Otake | 303/122.05 |
| 6,549,840 B1 * | 4/2003 | Mikami et al. | 701/69 |
| 7,238,133 B2 * | 7/2007 | Tabata et al. | 475/5 |
| 2002/0056584 A1 * | 5/2002 | Nakasako et al. | 180/248 |
| 2010/0217491 A1 * | 8/2010 | Naito et al. | 701/49 |

FOREIGN PATENT DOCUMENTS

| | | |
|---|---|---|
| JP | 63116932 A * | 5/1988 |
| JP | 64-29636 | 1/1989 |
| JP | 5-8713 | 1/1993 |
| JP | 9-328064 | 12/1997 |
| JP | 2002-27610 | 1/2002 |
| JP | 2004-84773 | 3/2004 |

* cited by examiner

ELECTRICALLY DRIVEN VEHICLE

TECHNICAL FIELD

The present invention relates to an electrically driven vehicle of which drive wheels are driven by electric motors for traveling.

BACKGROUND ART

When a vehicle is traveling on a slippery road such as a frozen road or a snow-compacted road, the driver's attempt to accelerate the vehicle by stepping on the accelerator may abruptly raise the rotating speed of the drive wheels and cause the drive wheels to spin out. Conversely, the driver's attempt to decelerate the vehicle by stepping on the brake may abruptly lower the rotating speed of the drive wheels and cause them to lock (in the following description, these phenomena will be collectively referred to as a slip). When such a slip occurs, the behavior of the vehicle is destabilized. With steering out of control, it is difficult for the vehicle to travel stably. Thus, it is important to reliably suppress the occurrence of such a slip.

One conventional method for detecting the occurrence of a vehicle slip involves detecting the wheel speed of the drive wheels and that of the idler wheels, computing the slip ratio of the drive wheels based on the detected wheel speeds, and determining whether the slip ratio exceeds a determination value so as to detect whether a slip has occurred. Another method involves detecting the wheel speed of the drive wheels and that of the idler wheels, computing the difference between the wheel speeds, and determining whether the speed difference exceeds a determination value in order to detect whether a slip has occurred (see JP-2002-27610-A, among others).

PRIOR ART LITERATURE

Patent Document

Patent Document 1: JP-2002-27610-A

SUMMARY OF THE INVENTION

Problem to be Solved by the Invention

One object of the present invention is to shorten the acceleration time of an electrically driven vehicle during acceleration traveling and to reduce the braking distance of the electrically driven vehicle during deceleration traveling. Generally, if a slip is detected during acceleration traveling, the drive power of the drive wheels is controlled to be lowered; if a slip is detected during deceleration traveling, the braking power of the drive wheels is controlled to be lowered (in the ensuing description, this type of control method will be referred to as slip control). If the accelerator is stepped on (for acceleration) in a stopped state or during traveling at low speed and if the drive power of the drive wheels is controlled to be lowered when the slip ratio of the drive wheels is found to exceed a predetermined value, then slip control can come into action excessively in a low-speed range, prolonging the acceleration time of the vehicle. This problem is caused by the slip ratio of the drive wheels becoming higher even while the difference in wheel speed between the drive wheels and the idler wheels remains very small. As a result, slip control comes into action excessively, lowering the drive torque of the drive wheels. On an upward slope in particular, the vehicle is pulled by gravity in a direction opposite that of acceleration. In such a case, lowering the drive torque of the drive wheels can make it more difficult for the vehicle to accelerate, inordinately prolonging the acceleration time of the vehicle. Also, if the brake is stepped on (for deceleration) while the vehicle is traveling and if the braking power of the drive wheels is controlled to be lowered when the slip ratio of the drive wheels is found to exceed a predetermined value, then slip control can come into action excessively in a low-speed range, prolonging the braking distance of the vehicle. This problem is caused by the slip ratio of the drive wheels becoming higher in the negative direction even while the difference in wheel speed between the drive wheels and the idler wheels remains very small. As a result, slip control comes into action excessively, lowering the braking torque of the drive wheels. On a downward slope in particular, the vehicle is pulled by gravity in the direction of acceleration. In such a case, lowering the braking torque of the drive wheels can make it further difficult for the vehicle to decelerate, inordinately prolonging the braking distance of the vehicle.

Another object of the present invention is to inhibit vibrations of the electrically driven vehicle. If the accelerator is stepped on in a stopped state or during traveling at low speed and if the drive power of the drive wheels is controlled to be lowered when the slip ratio of the drive wheels is found to exceed a predetermined value, then slip control can come into action excessively in a low-speed range, changing the drive torque in a manner rising and falling with high frequency. When the drive torque is changed frequently, the vehicle body generates vibrations causing ride quality to deteriorate. On an upward slope in particular, lowering the drive torque of the drive wheels makes the vehicle more difficult to accelerate as described above, prolonging the vibrating state of the vehicle. Also, if the brake is stepped on while the vehicle is traveling and if the braking power of the drive wheels is controlled to be lowered when the slip ratio of the drive wheels is found to exceed a predetermined value, then slip control can come into action excessively in a low-speed range, changing the drive torque in a manner rising and falling with high frequency. When the drive torque is changed frequently, the vehicle body generates vibrations causing ride quality to deteriorate. On a downward slope in particular, as described above, lowering the braking torque of the drive wheels makes it more difficult for the vehicle to decelerate, prolonging the vibrating state of the vehicle.

The above-described method that involves detecting the wheel speed of the drive wheels and that of the idler wheels so as to determine the occurrence of a slip on the drive wheels has this problem: the acceleration time of the electrically driven vehicle is prolonged during acceleration traveling and the braking distance of the vehicle is extended during deceleration traveling because slip control comes into action excessively in a low-speed range when the accelerator or the brake is stepped on. Another problem of the above-described method is that the vehicle is subject to increasing vibrations because the torque of the drive wheels is changed in a manner rising falling with high frequency.

The primary object of the present invention is to shorten the acceleration time of an electrically driven vehicle during acceleration traveling and to reduce the braking distance of the vehicle during deceleration traveling while inhibiting vibrations of the vehicle.

Means for Solving the Problem

In achieving the foregoing object of the present invention, there is provided an electrically driven vehicle equipped with drive wheels, idler wheels, electric motors for driving or braking the drive wheels, and electric motor controlling means for controlling the electric motors. The electrically driven vehicle includes: wheel speed detecting means for detecting the wheel speed of the drive wheels and that of the idler wheels; computing means for computing the slip ratio of the drive wheels based on the wheel speed of the drive wheels and that of the idler wheels; and determining means for determining that the drive wheels are slipping if the slip ratio exceeds a slip ratio determination value. If the wheel speed of the idler wheels is lower than a set speed, then the determining means changes the slip ratio determination value to a value having as the same sign as, and a larger absolute value than, the value used when the wheel speed of the idler wheels is higher than the set speed.

Effects of the Invention

According to the present invention, the determining means changes the slip ratio determination value or speed difference determination value in keeping with the detected wheel speed of the idler wheels so as to suppress the execution of excessive slip control in a low-speed range. This shortens the acceleration time during acceleration traveling and reduces the braking distance during deceleration traveling while inhibiting vibrations of the electrically driven vehicle.

MODES FOR CARRYING OUT THE INVENTION

Figure 1:
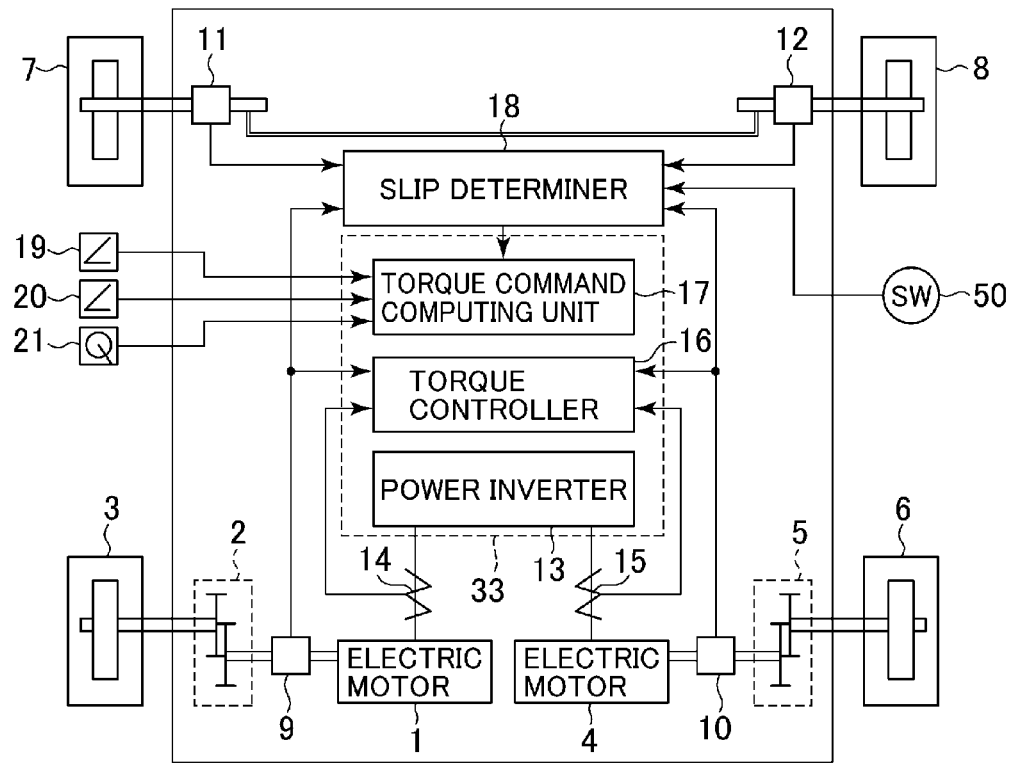
FIG. 1 is a general view of an electrically driven vehicle as a first embodiment of the present invention.

Some embodiments of the present invention will be explained below in reference to the accompanying drawings.
FIG. 1 is a general view of an electrically driven vehicle as the first embodiment of the present invention. The electrically driven vehicle shown in FIG. 1 includes drive wheels 3 and 6, idler wheels 7 and 8, an electric motor 1 for driving the drive wheel 3 via a gear 2, an electric motor 4 for driving the drive wheel 6 via a gear 5, an electric motor controller (electric motor controlling means) 33 for controlling the electric motors 1 and 4, and a slip determiner 18 for computing the slip ratio of the drive wheel 3 and that of the drive wheel 6 so as to determine whether a slip has occurred.

The electric motor controller 33 includes a torque command computing unit 17, a torque controller 16, and a power inverter 13. The electric motors 1 and 4 are under control of the electric motor controller 33. The electric motors 1 and 4 drive the drive wheels 3 and 6 via the gears 2 and 5, causing the vehicle to travel forward or backward.

Also, the electrically driven vehicle shown in FIG. 1 includes speed detectors 9, 10, 11 and 12. The speed detector 9 is connected to the electric motor 1 and detects the rotating speed thereof. The speed detector 10 is connected to the electric motor 4 and detects the rotating speed thereof. The speed detector 11 is connected to the axle of the idler wheel 7 and detects the rotating speed of the idler wheel 7. The speed detector 12 is connected to the axle of the idler wheel 8 and detects the rotating speed of the idler wheel 8. The speed detectors 9, 10, 11 and 12 are connected to a slip determiner 18, and the speeds detected by these detectors are output to the slip determiner 18. Also, the speed detectors 9 and 10 are connected to the torque controller 16, and the speeds detected by these detectors are output to the torque controller 16.

The torque command computing unit 17 is connected with an accelerator opening detector 19 for detecting the opening of the accelerator pedal as it is stepped on by the driver, a brake opening detector 20 for detecting the opening of the brake pedal as it is pressed by the driver, and a steering angle detector 21 for detecting the angle of the steering wheel as it is turned by the driver. The torque command computing unit 17 computes torque commands to the electric motors 1 and 4 given the input of the detected accelerator opening from the accelerator opening detector 19, the detected brake opening from the brake opening detector 20, and the detected steering angle from the steering angle detector 21. The torque command computing unit 17 outputs the torque commands thus computed to the torque controller 16.

A current detector 14 is connected interposingly between the power inverter 13 and the electric motor 1 and detects currents flowing therebetween. The current value detected by the current detector 14 is output to the torque controller 16. Also, a current detector 15 is connected interposingly between the power inverter 13 and the electric motor 4 and detects currents flowing therebetween. The current value detected by the current detector 15 is output to the torque controller 16.

Based on the torque command output by the torque command computing unit 17 to the electric motor 1, on the current value detected and output by the current detector 14, and on the rotating speed value detected and output by the speed detector 9, the torque controller 16 outputs a gate pulse signal to the power inverter 13 through pulse width modulation (PWM) control so that the torque output by the electric motor 1 follows the torque command to the electric motor 1. Also, based on the torque command output by the torque command computing unit 17 to the electric motor 4, on the current value detected and output by the current detector 15, and on the rotating speed value detected and output by the speed detector 10, the torque controller 16 outputs a gate pulse signal to the power inverter 13 through PWM control so that the torque output by the electric motor 4 follows the torque command to the electric motor 4.

Upon receiving the gate pulse signal from the torque controller 16, the power inverter 13 has its switching elements such as IGBT (insulated gate bipolar transistors) perform switching at high speed accordingly, thereby implementing highly responsive torque control on the electric motors 1 and 4.

Given input of the rotating speeds detected and output by the speed detectors 9, 10, 11 and 12, the slip determiner 18 determines whether a slip has occurred on the drive wheels 3 and 6. For example, if it is determined that a slip has occurred on the drive wheel 3 or 6 or on both drive wheels 3 and 6, the slip determiner 18 outputs a torque reduction command to the torque command computing unit 17 so that the torque output by the electric motor 1 or 4 or by both electric motors 1 and 4 is reduced.

Figure 2:
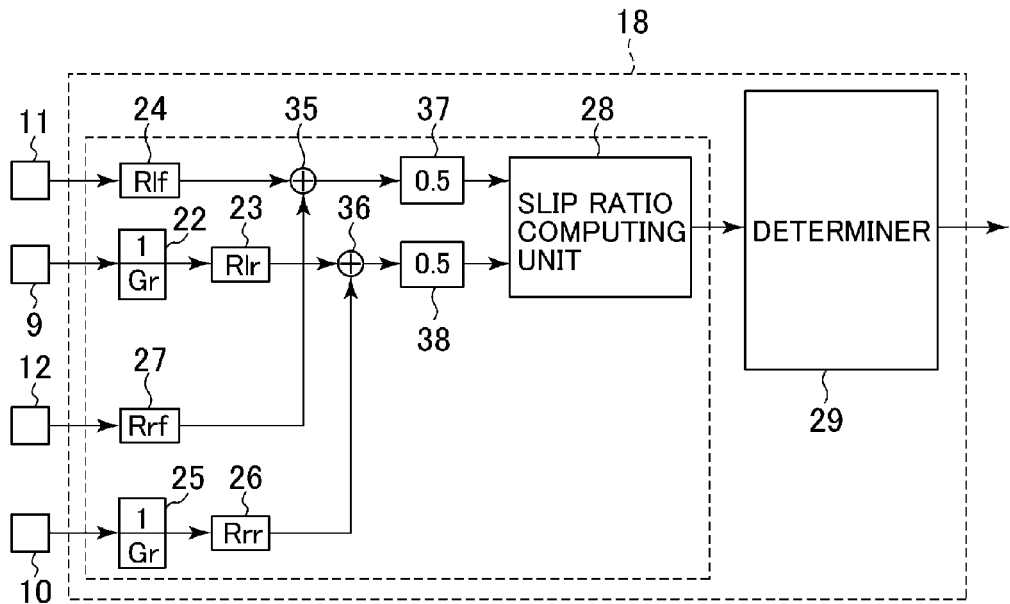
FIG. 2 is a configuration diagram of a slip determiner 18 in the first embodiment of the invention.

The structure of the slip determiner 18 is explained next. FIG. 2 is a block diagram of the slip determiner 18 in the first embodiment of the invention. Of the component parts shown in FIG. 2, those also found in FIG. 1 are designated by like reference numerals and their explanations will be omitted where redundant (the parts found in the subsequent figures will also be handled in the same manner). The slip determiner 18 shown in FIG. 2 includes gains 22, 23, 24, 25, 26 and 27; adders 35 and 36, gains 37 and 38, and a slip ratio computing unit 28, as computing means for computing the slip ratio of the drive wheels 3, 6 based on the wheel speeds of the drive wheels 3, 6 and of the idler wheels 7, 8. The slip determiner 18 also includes a determiner (determining means) 29 for determining that the drive wheels 3, 6 are slipping if the slip ratio computed by the computing means exceeds a slip ratio determination value.

The gain 22 computes a detected rotating speed of the drive wheel 3 by multiplying the rotating speed of the electric motor 1 output from the speed detector 9 by a gain given as the inverse number of the gear ratio Gr of the gear 2. The rotating speed value thus detected is output to the gain 23. The gain 23 computes a detected wheel speed of the drive wheel 3 by multiplying the detected rotating speed of the drive wheel 3 output from the gain 22 by the radius Rlr of the drive wheel 3. The wheel speed value thus detected is output to the adder 36. The gain 24 computes a detected wheel speed of the idler wheel 7 by multiplying the detected rotating speed of the idler wheel 7 output from the speed detector 11 by the radius Rlf of the idler wheel 7. The wheel speed value thus detected is output to the adder 35.

The gain 25 computes a detected rotating speed of the drive wheel 6 by multiplying the detected rotating speed of the electric motor 4 output from the speed detector 10 by a gain given as the inverse number of the gear ratio Gr of the gear 5. The rotating speed value thus detected is output to the gain 25. The gain 26 computes a detected wheel speed of the drive wheel 6 by multiplying the detected rotating speed of the drive wheel 6 output from the gain 25 by the radius Rrr of the drive wheel 6. The wheel speed value thus detected is output to the adder 36. The gain 27 computes a detected wheel speed of the idler wheel 8 by multiplying the detected rotating speed of the idler wheel 8 output from the speed detector 12 by the radius Rrf of the idler wheel 8. The wheel speed value thus detected is output to the adder 35.

The adder 35 outputs to the gain 37 the sum of the detected wheel speeds of the idler wheels 7 and 8. The adder 36 outputs to the gain 38 the sum of the detected wheel speeds of the drive wheels 3 and 6. The gain 37 computes a mean value of the detected wheel speeds of the idler wheels 7 and 8 output from the adder 35 by multiplying the sum of these detected wheel speeds by a gain of 0.5. The mean value thus computed is output to the slip ratio computing unit 28. The gain 38 computes a mean value of the detected wheel speeds of the drive wheels 3 and 6 output from the adder 36 by multiplying the sum of these detected wheel speeds by a gain of 0.5. The mean value thus computed is output to the slip ratio computing unit 28.

The slip ratio computing unit 28 computes the slip ratio of the drive wheels 3 and 6 based on the mean value of the detected wheel speeds of the idler wheels 7 and 8 output from the gain 37 and on the mean value of the detected wheel speeds of the drive wheels 3 and 6 output from the gain 38. Since the wheels 7 and 8 are idler wheels, the mean value of their detected wheel speeds is assumed to represent the actual vehicle speed.

Figure 3:
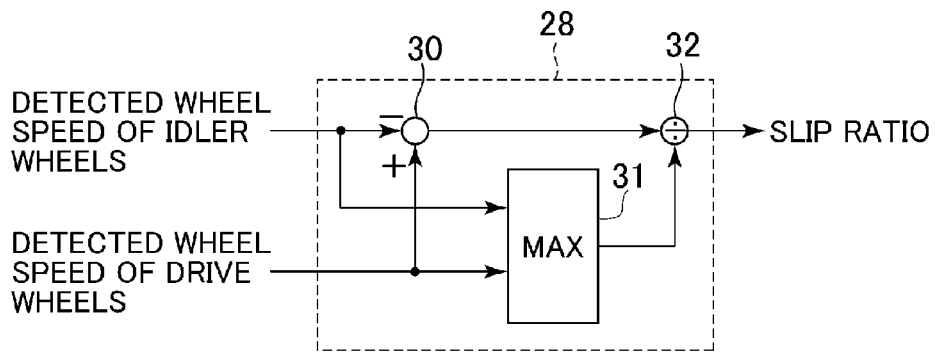
FIG. 3 is a configuration diagram of a slip ratio computing unit 28 in the first embodiment of the invention.

A specific structure of the slip ratio computing unit 28 is explained below in reference to FIG. 3. FIG. 3 is a configuration diagram of the slip ratio computing unit 28 in the first embodiment of the invention. The slip ratio computing unit 28 shown in FIG. 3 includes a subtractor 30, a maximum value selector 31, and a divider 32. Given input of the detected wheel speed of the drive wheels 3, 6 and the detected wheel speed of the idler wheels 7, 8, the subtractor 30 subtracts the detected wheel speed of the idler wheels 7, 8 from the detected wheel speed of the drive wheels 3, 6 and outputs the difference to the divider 32. Given input of the detected wheel speed of the drive wheels 3, 6 and the detected wheel speed of the idler wheels 7, 8, the maximum value selector 31 outputs the larger of the two speed values to the divider 32. The divider 32 divides the output from the subtractor 30 by the output from the maximum value selector 31 so as to output a slip ratio. These operations are formulated in the expression (1) shown below. In the expression (1), $\lambda$ denotes the slip ratio of the drive wheels output from the slip ratio computing unit 28, Vr represents the wheel speed of the drive wheels, and V stands for the wheel speed of the idler wheels.

$$\lambda = \frac{Vr - V}{\text{Max}\{Vr, V\}} \quad (1)$$

Figure 4:
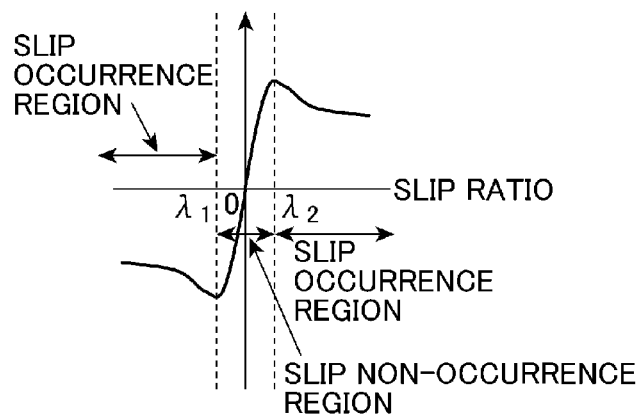
FIG. 4 is a diagram showing relations between slip ratio and the coefficient of friction between the wheels and the road surface.

What follows is an explanation of the relation between the slip ratio and the wheel-to-road surface friction coefficient. FIG. 4 is a diagram showing typical relations between the slip ratio and the coefficient of friction between the wheels and the road surface. In that region of FIG. 4 where the friction coefficient is negative, the force produced between the wheels and the road surface is shown opposite to the direction in which the vehicle is traveling forward. Generally, in the region where the absolute value of the slip ratio is small (in FIG. 4, the region in which the absolute value of slip ratio is near zero), a rise in the absolute value of the slip ratio entails an increase in the absolute value of the coefficient of friction between the wheels and the road surface. That in turn boosts the force produced between the wheels and the road surface, eliminating the occurrence of a slip. That is, that region of FIG. 4 in which a slip does not occur is where the slip ratio $\lambda$ satisfies the relations $\lambda_1 < \lambda < \lambda_2$ (slip non-occurrence region).

Meanwhile, after the absolute value of the wheel-to-road surface friction coefficient is maximized in the slip non-occurrence region, a subsequent rise in the absolute value of the slip ratio entails a decrease in the absolute value of the wheel-to-road surface friction coefficient from the maximum value. This results in a drop in the force produced between the wheels and the road surface, incurring a slip. That region of FIG. 4 in which a slip occurs is where the slip ratio $\lambda$ satisfies the relations $\lambda > \lambda_2$ or $\lambda < \lambda_1$ (slip occurrence region). Thus it is possible to determine whether or not a slip has occurred by computing the slip ratio and by determining whether the computed slip ratio falls into the slip occurrence region.

The determiner 29 receives the input of the slip ratio output from the slip ratio computing unit 28. If the input slip ratio exceeds a slip determination value (to be discussed later), the determiner 29 determines that the drive wheels 3, 6 are slipping. Upon determining that the drive wheels 3, 6 are slipping (to be called slip determination where appropriate), the determiner 29 outputs a torque reduction command to the electric motor controller 33 for slip control execution.

Figure 5:
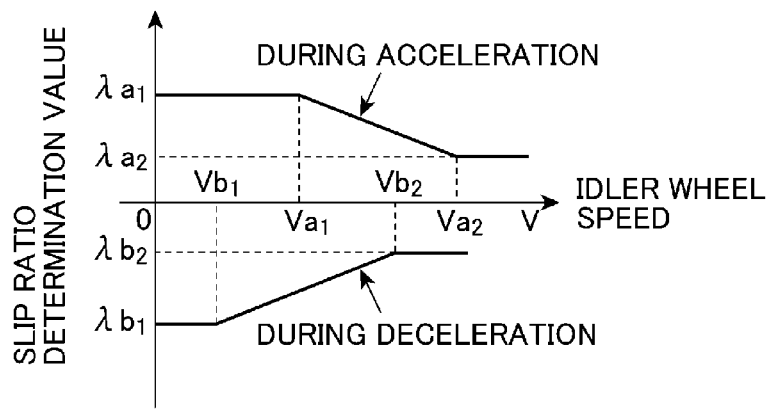
FIG. 5 is a diagram showing relations during acceleration and deceleration traveling between detected wheel speeds of the idler wheels detected on the one hand, and slip ratio determination values used by a determiner 29 on the other hand.

FIG. 5 is a diagram showing relations during acceleration and deceleration traveling between detected wheel speeds of the idler wheels on the one hand, and slip ratio determination values used by the determiner 29 on the other hand. As shown in FIG. 5, when the wheel speed of the idler wheels 7, 8 is higher than a set speed $Va_2$ (e.g., several km/h depending on the precision of the wheel speed detecting means) during acceleration traveling, the determiner 29 uses a constant value $\lambda a_2$ as the slip ratio determination value. When the wheel speed of the idler wheels 7, 8 is lower than the set speed $Va_2$, the determiner 29 changes the slip ratio determination value to a value (e.g., $\lambda a_1$) larger than the constant value $\lambda a_2$. That is, when the wheel speed of the idler wheels 7, 8 becomes lower than the set speed $Va_2$ during acceleration traveling, the slip determination value is changed to a value having the same sign (positive) and a larger absolute value. With this embodiment, the value $\lambda a_2$ is assumed to correspond to $\lambda_2$ at which the friction coefficient is seen maximized in FIG. 4.

On the other hand, when the wheel speed of the idler wheels 7, 8 is higher than a set speed $Vb_2$ (e.g., several km/h depending on the precision of the wheel speed detecting means) during deceleration traveling, the determiner 29 uses a constant value $\lambda b_2$ as the slip ratio determination value. When the wheel speed of the idler wheels 7, 8 is lower than the set speed $Vb_2$, the determiner 29 changes the slip ratio determination value to a value (e.g., $\lambda b_1$) smaller than the constant value $\lambda b_2$. That is, when the wheel speed of the idler wheels 7, 8 becomes lower than the set speed $Vb_2$ during deceleration traveling, the slip determination value is changed to a value having the same sign (negative) and a larger absolute value. With this embodiment, the value $\lambda b_2$ is assumed to correspond to $\lambda_1$ at which the friction coefficient is seen maximized in FIG. 4.

To sum up the foregoing description, it may be said that when the wheel speed of the idler wheels 7, 8 is lower than the set speed $Va_2$ or $Vb_2$ during acceleration or deceleration traveling respectively, the determiner 29 of this embodiment changes the slip ratio determination value to a value having the same sign as, and a larger absolute value than, the value $\lambda a_2$ or $\lambda b_2$ used when the wheel speed of the idler wheels 7, 8 is higher than the corresponding set speed $Va_2$ or $Vb_2$. It may also be said that the slip ratio determination value is changed to a value with which a slip is less likely to be determined and which is different from the value $\lambda a_2$ or $\lambda b_2$ used when the wheel speed of the idler wheels 7, 8 is higher than the corresponding set speed $Va_2$ or $Vb_2$.

This embodiment provides a monotonic increase part and a monotonic decrease part ([A3] and [B3], to be discussed below) for varying the slip ratio determination value, whereby changes in the behavior of the vehicle resulting from slip control are lessened so as to alleviate the driver's discomfort. That is, [A1] when the wheel speed of the idler wheels 7, 8 is higher than the set speed $Va_2$ (first set speed), the slip ratio determination value used by the embodiment during acceleration traveling is set to the determination value $\lambda a_2$ (first determination value); [A2] when the wheel speed of the idler wheels 7, 8 is lower than the set speed $Va_1$ (second set speed) set to be lower than the set speed $Va_2$, the slip ratio determination value is set to $\lambda a_1$ (second determination value) larger than the determination value $\lambda a_2$; [A3] when the wheel speed of the idler wheels 7, 8 is lower than $Va_2$ and higher than $Va_1$, the slip ratio determination value is set monotonically to increase from $\lambda a_2$ to $\lambda a_1$ as the wheel speed of the idler wheels 7, 8 drops. Also, [B1] when the wheel speed of the idler wheels 7, 8 is higher than the set speed $Vb_2$ (third set speed), the slip ratio determination value used by the embodiment during deceleration traveling is set to the determination value $\lambda b_2$ (third determination value); [B2] when the wheel speed of the idler wheels 7, 8 is lower than the set speed $Vb_1$ (third set speed) set to be lower than the set speed $Vb_2$, the slip ratio determination value is set to $\lambda b_1$ (fourth determination value) larger than the determination value $\lambda b_2$; [B3] when the wheel speed of the idler wheels 7, 8 is lower than $Vb_2$ and higher than $Vb_1$, the slip ratio determination value is set monotonically to decrease from $\lambda b_2$ to $\lambda b_1$ as the wheel speed of the idler wheels 7, 8 drops.

What follows is an explanation of changes in the wheel speeds of the idler wheels 7, 8 and drive wheels 3, 6 in effect when the slip determiner 18 (determiner 29) outputs a torque reduction command to the electric motor controller 33 for slip control execution. Explained first is what happens when the accelerator is stepped on (for acceleration traveling). Generally, it has been known that with the vehicle traveling on a slippery road surface, stepping on the accelerator can cause the drive wheels to spin out and that without slip control, the wheel speed of the drive wheels can become higher than the wheel speed of the idler wheels. In practice, wheel revolutions are controlled under slip control so that the wheel speed of the drive wheels approaches the wheel speed of the idler wheels.

Figure 6:
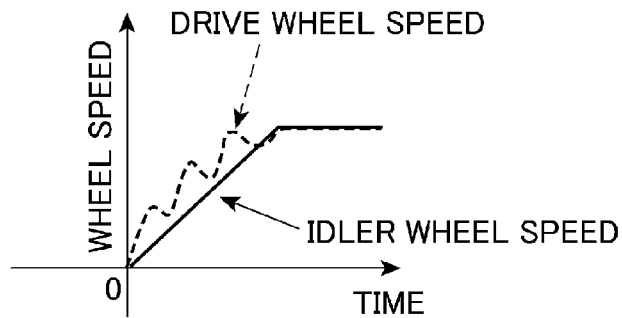
FIG. 6 is a diagram showing waveforms of the wheel speeds of the idler wheels and drive wheels under slip control during acceleration traveling.

FIG. 6 is a diagram showing waveforms of the wheel speeds of the idler wheels and drive wheels under slip control during acceleration traveling. As shown in FIG. 6, if the slip ratio exceeds the slip ratio determination value when the accelerator is stepped on while the vehicle is either in a stopped state or is traveling, slip control is performed as described above to lower the drive torque of the drive wheels so that the wheel speed of the drive wheels is seen approaching the wheel speed of the idler wheels. Incidentally, as long as the accelerator is being stepped on, the relation (drive wheel speed)≥(idler wheel speed) is thought to hold. Thus the above-described expression (1) may be transformed into the expression (2) shown below. This shows that the value of the slip ratio λ is always positive whenever the accelerator is stepped on.

$$\lambda = \frac{Vr - V}{Vr} \quad (2)$$

Explained next is what happens when the brake is stepped on (for deceleration traveling). It has been known that when the brake is stepped on, the drive wheels would be locked and that the wheel speed of the drive wheels would become near zero without slip control. In practice, wheel revolutions are controlled under slip control so that the wheel speed of the drive wheels approaches the wheel speed of the idler wheels.

Figure 7:
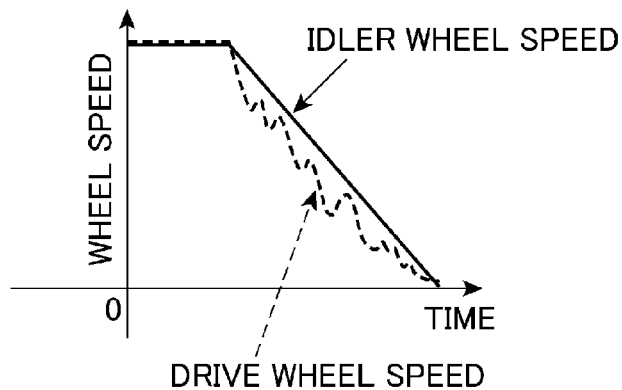
FIG. 7 is a diagram showing waveforms of the wheel speeds of the idler wheels and drive wheels under slip control during deceleration traveling.

FIG. 7 is a diagram showing waveforms of the wheel speeds of the idler wheels and drive wheels under slip control during deceleration traveling. As shown in FIG. 7, if the slip ratio drops below the slip ratio determination value when the brake is stepped on while the vehicle is traveling, slip control is performed as described above to lower the braking torque of the drive wheels so that the wheel speed of the drive wheels is seen approaching the wheel speed of the idler wheels. Incidentally, as long as the brake is being stepped on, the relation (idler wheel speed)≥(drive wheel speed) is thought to hold. Thus the above-described expression (1) may be transformed into the expression (3) shown below. This shows that the value of the slip ratio λ is always negative whenever the brake is stepped on.

$$\lambda = \frac{Vr - V}{V} \quad (3)$$

Explained next is the reason why the slip radio determination value should be varied depending on the wheel speed of the idler wheels as described above. As shown in FIG. 4, the slip non-occurrence region is where the slip ratio λ satisfies the relations $\lambda_1 < \lambda < \lambda_2$. Thus in order to suppress the occurrence of a slip during acceleration traveling, the slip ratio determination value ought to be set to $\lambda_2$ to control the drive torque of the drive wheels to drop when the slip ratio λ becomes larger than the corresponding determination value $\lambda_2$; during deceleration traveling, the slip ratio determination value ought to be set to $\lambda_1$ to control the drive torque of the drive wheels to drop when the slip ratio λ becomes smaller than the corresponding determination value $\lambda_1$. However, the inventors found that when the wheel speed of the idler wheels reaches a low-speed range (about several km/h or lower depending on the precision of the wheel speed detecting means), the problem of erroneous slip determination can occur, as will be explained below. Generally, the value $\lambda_1$ is approximately between −0.1 and −0.2, and the value $\lambda_2$ is approximately between 0.1 and 0.2. For the following explanation, it is assumed that $\lambda_1 = −0.1$ and $\lambda_2 = 0.1$, that the slip ratio determination value during acceleration traveling is 0.1, and that the slip ratio determination value during deceleration traveling is −0.1.

Suppose first that the vehicle is gradually accelerating from its stopped state. For example, when the wheel speed V of the idler wheels is 1 km/h, the slip ratio λ is seen becoming larger than 0.1 if the wheel speed Vr of the drive wheels becomes higher than about 1.11 km/h based on the expression (2) above. On the other hand, when the wheel speed V of the idler wheels is 50 km/h, the slip ratio λ is seen becoming larger than 0.1 if the wheel speed Vr of the drive wheels becomes higher than about 55.6 km/h based on the expression (2) above. That is, in the low-speed range of about several kilometers per hour as opposed to a high-speed range of several tens of kilometers per hour, the value of the slip ratio λ can vary in a relatively significant manner even if the difference between the idler wheel speed V and the drive wheel speed Vr is very small. Since the idler wheel speed V and the drive wheel speed Vr always include a speed detection error each, the slip ratio λ in the low-speed range can become larger than the slip ratio determination value due to such errors. In that case, the determiner 29 can erroneously determine that a slip has occurred even if the drive wheels 3, 6 are actually not slipping.

Suppose now that the vehicle is gradually decelerating in its traveling state. For example, when the wheel speed V of the idler wheels is 50 km/h, the slip ratio λ is seen becoming smaller than −0.1 if the wheel speed Vr of the idler wheels becomes lower than about 45 km/h based on the expression (3) above. On the other hand, when the wheel speed V of the idler wheels is 1 km/h, the slip ratio λ is seen becoming smaller than −0.1 if the wheel speed Vr of the drive wheels becomes lower than 0.9 km/h based on the expression (3) above. That is, in the low-speed range as opposed to the high-speed range, the value of the slip ratio λ can be very small even if the difference between the idler wheel speed V and the drive wheel speed Vr is very small. As in the case of acceleration traveling, the slip ratio λ in the low-speed range can thus become smaller than the slip ratio determination value due to speed detection errors. In that case, the determiner 29 can erroneously determine that a slip has occurred even if the drive wheels 3, 6 are actually not slipping.

With this embodiment, the slip ratio determination value is adjusted to vary in keeping with the wheel speed of the idler wheels 7, 8 as shown in FIG. 5, so that a slip will not be erroneously determined even if speed detection errors are included in the wheel speed V of the idler wheels 7, 8 and in the wheel speed Vr of the drive wheels 3, 6 in the low-speed range.

Figure 8:
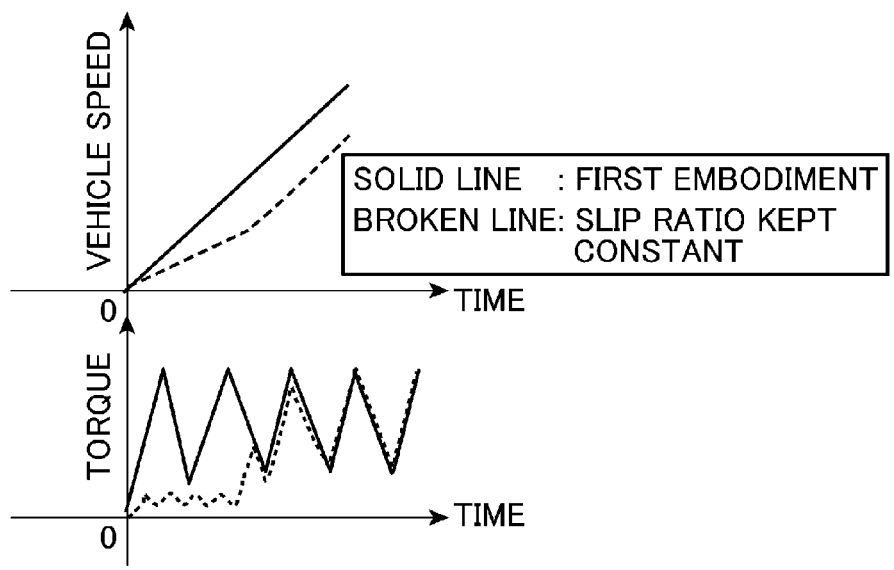
FIG. 8 is a diagram showing relations between torque and vehicle speed in effect when the accelerator is stepped on while the vehicle is in a stopped state.

What follows is a comparison, in terms of relations between drive wheel torque and vehicle speed, between two cases: where the slip ratio determination value is varied as with this embodiment, and where the slip ratio determination value is kept constant. FIG. 8 is a diagram showing relations between torque and vehicle speed in effect when the accelerator is stepped on while the vehicle is in a stopped state. When the slip ratio determination value is kept constant, the torque is seen rising and falling frequently in a low-speed range as the vehicle starts moving. That is because the drive torque is lowered unnecessarily in the low-speed range in which a slip is determined to have occurred even if there is little difference in wheel speed between the idler wheels and the drive wheels. Lowering the drive torque unnecessarily brings about a low-torque state on average that deteriorates the acceleration performance of the vehicle. Also, with the torque rising and falling frequently, the vehicle body generates vibrations causing ride quality to deteriorate.

With this embodiment, by contrast, varying the slip ratio determination value in the low-speed range prevents erroneous determination of a slip and reduces the frequent rising and falling of the torque to permit output of a high drive torque on average, which improves the acceleration performance of the vehicle. Ride quality is also improved because the torque is prevented from frequently rising and falling. As the vehicle speed increases during acceleration traveling, erroneous slip determination does not occur because the value of the slip ratio remains small even with the slip ratio determination value kept constant unless the difference in wheel speed between the idler wheels 7, 8 and the drive wheels 3, 6 becomes appreciably large. This provides output of a drive torque waveform similar to that of the drive torque in effect when this invention is practiced.

Figure 9:
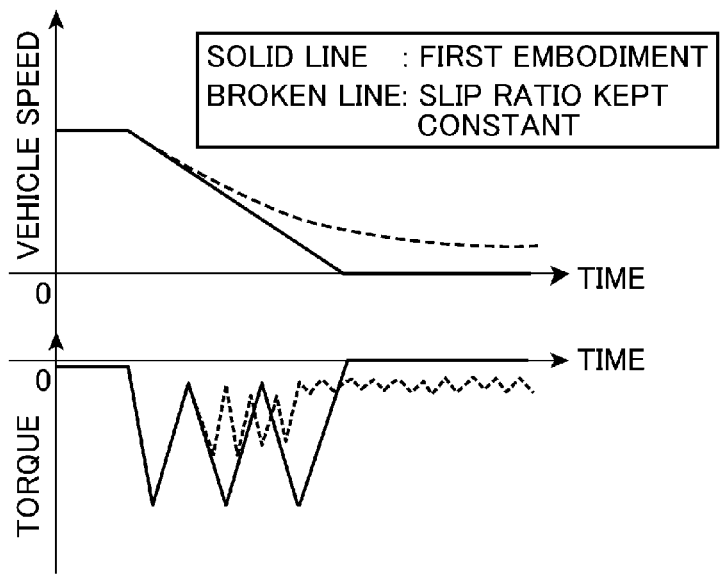
FIG. 9 is a diagram showing relations between torque and vehicle speed in effect when the traveling vehicle gradually decelerates.

FIG. 9 is a diagram showing relations between torque and vehicle speed in effect when the traveling vehicle gradually decelerates. Before the brake is stepped on, or when the slip ratio determination value is kept constant for some time after the brake is operated, erroneous slip determination does not occur because the value of the slip ratio remains small unless the difference in wheel speed between the idler wheels and the drive wheels becomes appreciably large. This provides output of a braking torque waveform similar to that of the braking torque in effect when this invention is practiced. On the other hand, when the slip ratio determination value is kept constant in a low-speed range during deceleration, the torque is seen rising and falling frequently. That is because the braking torque is lowered unnecessarily in the low-speed range in which a slip is determined to have occurred even if there is little difference in wheel speed between the idler wheels and the drive wheels. Lowering the braking torque unnecessarily brings about a low-torque state on average that deteriorates the braking performance of the vehicle. Also, with the torque rising and falling frequently, the vehicle body generates vibrations causing ride quality to deteriorate.

With this embodiment, by contrast, varying the slip ratio determination value in the low-speed range prevents erroneous determination of a slip and reduces the frequent rising and falling of the torque to permit output of a high braking torque on average, which improves the braking performance of the vehicle. Ride quality is also improved because the torque is kept from frequently rising and falling.

As described above, when the slip ratio determination value is kept constant during acceleration or deceleration traveling, erroneous slip determination tends to occur in the low-speed range so that the torque rises and falls frequently and is thereby lowered on average. In the face of this problem, this embodiment of the invention raises the slip ratio determination value in the positive direction during acceleration traveling or in the negative direction during deceleration traveling in the low-speed range, thereby preventing erroneous slip determination in the low-speed range and reducing the frequent rising and falling of the torque. As a result, it is possible to output on average a high drive torque during acceleration traveling and a high braking torque during deceleration traveling and thereby improve the acceleration and braking performance of the vehicle respectively. With excessive slip control thus inhibited in the low-speed range by the embodiment of this invention, it is possible to shorten the acceleration time during acceleration traveling and to reduce the braking distance during deceleration traveling while suppressing vibrations of the electrically driven vehicle.

Also, as shown in FIG. 1, there may be provided instructing means (e.g., changeover switch) 50 for instructing the slip determiner 18 to suspend the above-described slip control execution or to suspend changing of the slip determination value in keeping with the wheel speed of the idler wheels 7, 8. Installing the instructing means 50 permits changing of relevant settings in accordance with the operating environment of the vehicle.

Explained next is the second embodiment of the present invention. Unlike the first embodiment, the electrically driven vehicle as the second embodiment has a slip determiner 18 that uses, in place of the slip ratio determination value, a speed difference determination value represented by the difference in wheel speed between the idler wheels 7, 8 and the drive wheels 3, 6. Here, the difference in wheel speed computed by the subtraction (drive wheel speed)-(idler wheel speed) is defined as "wheel speed difference," and the determination value for determining whether the drive wheels 3, 6 are slipping based on the wheel speed difference is defined as "speed difference determination value."

Figure 10:
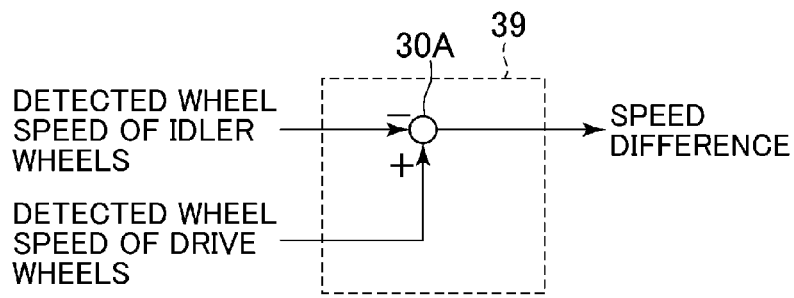
FIG. 10 is a block diagram of a speed difference computing unit 39 constituting part of a second embodiment of the present invention.

The electrically driven vehicle as the second embodiment includes a speed difference computing unit 39 shown in FIG. 10 in place of the slip ratio computing unit 28 indicated in FIG. 3 as part of the first embodiment. The remaining hardware components are the same as those of the first embodiment and thus will not be discussed further.

FIG. 10 is a block diagram of the speed difference computing unit 39 constituting part of the second embodiment of the present invention. The speed difference computing unit 39 shown in FIG. 10 includes a subtractor 30A which, given input of a detected wheel speed of the drive wheels 3, 6 and a detected wheel speed of the idler wheels 7, 8 from the gains 37 and 38, subtracts the value of the detected wheel speed of the idler wheels 7, 8 from the value of the detected wheel speed of the drive wheels 3, 6 so as to compute the wheel speed difference therebetween.

Figure 11:
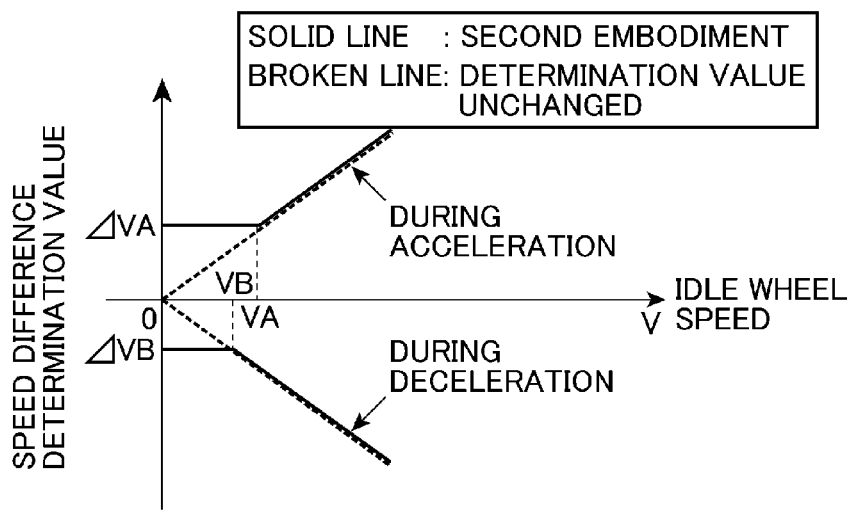
FIG. 11 is a diagram showing relations during acceleration and deceleration traveling between the wheel speeds of idler wheels 7, 8 on the one hand, and the differences in wheel speeds between the idler wheels 7, 8 and drive wheels 3, 6 on the other hand.

FIG. 11 is a diagram showing relations during acceleration and deceleration traveling between the wheel speeds of idler wheels 7, 8 on the one hand, and the differences in wheel speed between the idler wheels 7, 8 and drive wheels 3, 6 on the other hand. As shown in FIG. 11, the determiner 29 uses a constant value $\Delta VA$ as the speed difference determination value when the wheel speed of the idler wheels 7, 8 is lower than a set speed VA (e.g., several km/h depending on the precision of the wheel speed detecting means) during acceleration traveling; when the wheel speed of the idler wheels 7, 8 is higher than the set speed VA, the determiner 29 increases the speed difference determination value monotonically from the constant value $\Delta VA$ as the wheel speed of the idler wheels 7, 8 increases. During deceleration traveling, on the other hand, the determiner 29 uses a constant value $\Delta VB$ as the speed difference determination value when the wheel speed of the idler wheels 7, 8 is lower than a set speed VB (e.g., several km/h depending on the precision of the wheel speed detecting means); when the wheel speed of the idler wheels 7, 8 is higher than the set speed VB, the determiner 29 decreases the speed difference determination value monotonically from the constant value $\Delta VB$ as the wheel speed of the idler wheels 7, 8 increases. To sum up the foregoing description, it may be said that when the wheel speed of the idler wheels 7, 8 is lower than the set speed VA or VB during acceleration or deceleration traveling respectively, the determiner 29 of the second embodiment changes the speed difference determination value to a value with which a slip is less likely to be determined and which is different from the value used when the wheel speed of the idler wheels 7, 8 is higher than the corresponding set speed VA or VB. During acceleration traveling, the determiner 29 (slip determiner 18) determines that a slip has occurred when (speed difference determination value)≤ (wheel speed difference); during deceleration traveling, it is determined that a slip has occurred when (wheel speed difference)≤(wheel speed difference determination value).

What follows is an explanation of the reason why the speed difference determination value should be varied depending on the wheel speed of the idler wheels as shown in FIG. 11. The case of acceleration traveling is explained first. To increase the speed difference determination value as the wheel speed of the idler wheels 7, 8 increases is equivalent to keeping the slip ratio determination value constant in the first embodiment. This can be easily understood from the expression (1) above. As with the first embodiment utilizing the slip ratio determination value, it might happen that in the low-speed range, the value of the wheel speed difference becomes larger than the speed difference determination value due to speed detection errors. In that case, the determiner 29 may erroneously determine that a slip has occurred even if the drive wheels 3, 6 are actually not slipping. The same can be said regarding the case of deceleration traveling. It might happen that in the low-speed range, the speed difference determination value becomes larger than the wheel speed difference due to speed detection errors. In this case, it may be erroneously determined that a slip has occurred even if the drive wheels 3, 6 are actually not slipping.

With the second embodiment, the speed difference determination value is adjusted as shown in FIG. 11 in keeping with the wheel speed of the idler wheels 7, 8 so that a slip will not be erroneously determined even if speed detection errors are included in the wheel speed V of the idler wheels 7, 8 and in the wheel speed Vr of the drive wheels 3, 6 in the low-speed range. When the speed difference determination value is kept constant regardless of the wheel speed of the idler wheels in the low-speed range during acceleration and deceleration traveling in the manner described above, it is possible to prevent erroneous determination of a slip in the low-speed range. Thus the second embodiment also inhibits excessive slip control in the low-speed range, shortening the acceleration time during acceleration traveling and reducing the braking distance during deceleration traveling while suppressing vibrations of the electrically driven vehicle.

That is, as in the first or the second embodiment, when the slip ratio determination value or speed difference determination value is varied while the wheel speed of the idler wheels 7, 8 is in the low-speed range, excessive slip control is suppressed. This prevents the slip determiner 18 from unnecessarily determining that a slip has occurred, inhibiting the drop in the torque output by the electric motor 1, by the electric motor 4, or by both. That in turn enhances acceleration performance during acceleration traveling and reduces the braking distance during deceleration traveling while suppressing vibrations of the vehicle body stemming from frequent rising and falling of the torque.

Figure 12:
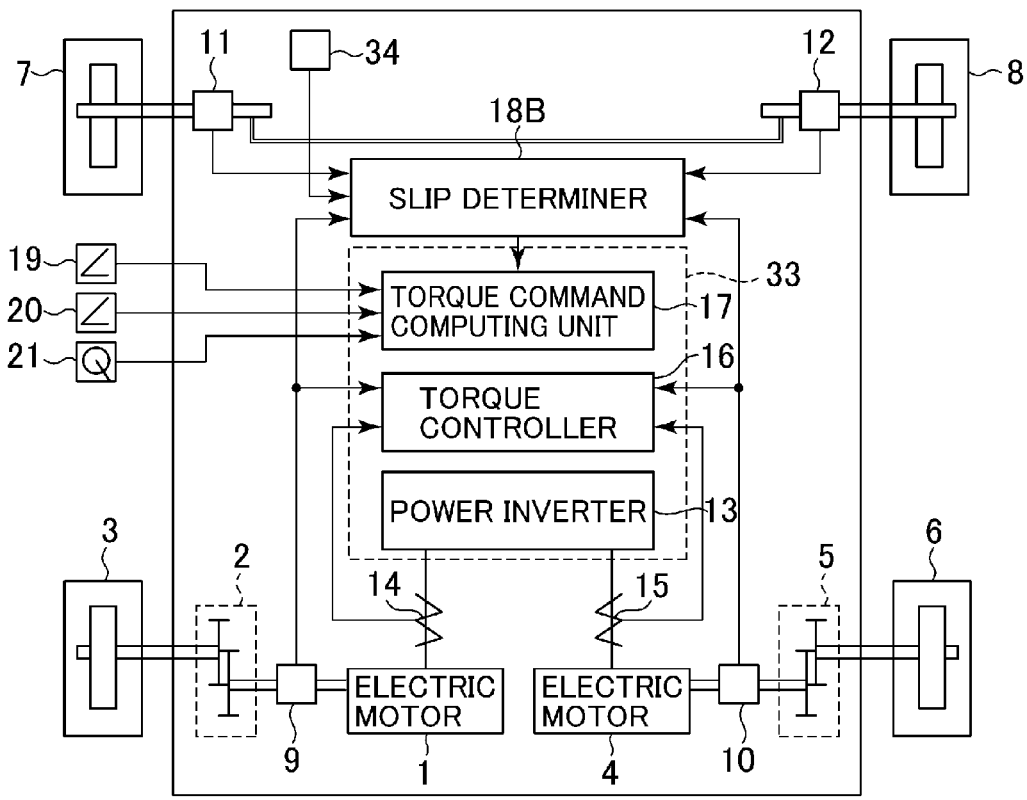
FIG. 12 is a general view of an electrically driven vehicle as a third embodiment of the present invention.

What follows is an explanation of the third embodiment of the present invention. FIG. 12 is a general view of an electrically driven vehicle as the third embodiment of the invention. The electrically driven vehicle shown in FIG. 12 includes an inclination sensor (inclination detecting means) 34 for detecting the inclination angle of the road surface on which the vehicle is traveling. The inclination angle of the road surface detected by the inclination sensor 34 is output to the determiner 29 in a slip determiner 18B. Using the output inclination angle, the determiner 29 determines whether the road surface is an upward slope steep enough to require changing the slip ratio determination value during acceleration traveling, or a downward slip steep enough to require changing the slip ratio determination value during deceleration traveling. If the detected inclination angle is larger than a set angle θa, the determiner 29 of the third embodiment determines that the road surface is an upward slope satisfying the above condition; if the detected inclination angle is smaller than a set angle θb, the determiner 29 determines that the road surface is a downward slope satisfying the above condition.

Figure 13:
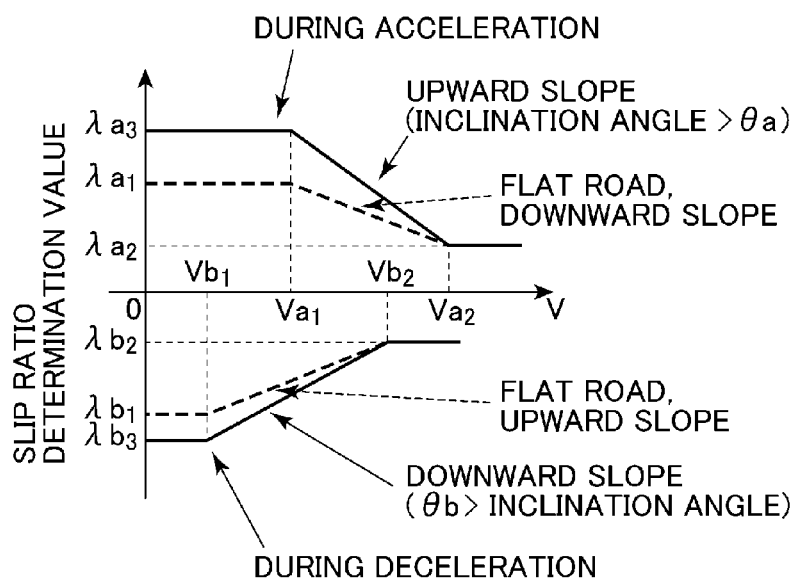
FIG. 13 is a diagram showing relations during acceleration and deceleration traveling between detected wheel speeds of the idler wheels 7, 8 on the one hand, and the slip ratio determination values used by the determiner 29 on the other hand.

FIG. 13 is a diagram showing relations during acceleration and deceleration traveling between detected wheel speeds of the idler wheels 7, 8 on the one hand, and the slip ratio determination values used by the determiner 29 on the other hand. As shown in FIG. 13, when the inclination angle of the road surface is larger than the set angle θa and the wheel speed of the idler wheels 7, 8 is lower than the set speed $Va_2$ during acceleration traveling, the determiner 29 changes the slip ratio determination value to a value ($\lambda a_3$) larger than the value used when the inclination angle is smaller than the set angle θa and the wheel speed of the idler wheels 7, 8 is lower than the set speed $Va_2$ (i.e., slip ratio determination value $\lambda a_1$ for the flat road and downward slope). On the other hand, when the inclination angle of the road surface is smaller than the set angle θb and the wheel speed of the idler wheels 7, 8 is lower than the set speed $Vb_2$ during deceleration traveling, the determiner 29 changes the slip ratio determination value to a value ($\lambda b_3$) smaller than the value used when the inclination angle is larger than the set angle θb and the wheel speed of the idler wheels 7, 8 is lower than the set speed $Vb_2$ (i.e., slip ratio determination value $\lambda b_1$ for the flat road and upward slope).

The reason why the slip ratio determination value is varied as described above in keeping with the inclination angle of the road surface and the wheel speed of the idler wheels 7, 8 is as follows. During acceleration traveling on the upward slope, the vehicle can be harder to accelerate if the same kind of erroneous slip detection as with the first embodiment occurs, given that the vehicle is pulled more by gravity in the direction discouraging acceleration than on the downward slope or flat road. To prevent this phenomenon, the third embodiment makes the slip ratio determination value larger for the upward slope. On the other hand, during deceleration traveling on the downward slope, the vehicle can be harder to decelerate if the same kind of erroneous slip detection as with the first embodiment occurs, given that the vehicle is pulled more by gravity in the direction discouraging deceleration than on the upward slope or flat road. To prevent this, the third embodiment makes the slip ratio determination value smaller for the downward slope.

When the slip ratio determination value is thus varied by the third embodiment, excessive slip control is inhibited in the low-speed range. This makes it possible to shorten the acceleration time during acceleration traveling on the upward slop and reduce the braking distance during deceleration traveling on the downward slope while suppressing vibrations of the electrically driven vehicle.

For the same reason as stated above, the speed difference determination value represented by the difference in wheel speed between the idler wheels 7, 8 and the drive wheels 3, 6 and used by the second embodiment may also be varied in keeping with the inclination angle of the road surface and with the wheel speed of the idler wheels 7, 8.

Figure 14:
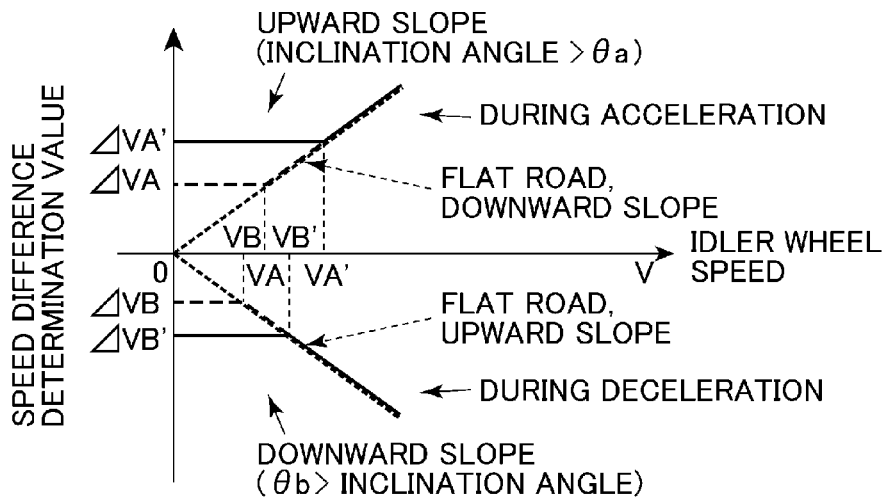
FIG. 14 is a diagram showing relations during acceleration and deceleration traveling between detected wheel speeds of the idler wheels 7, 8 on the one hand, and the speed difference determination values used by the determiner 29 on the other hand.

FIG. 14 is a diagram showing relations during acceleration and deceleration traveling between detected wheel speeds of the idler wheels 7, 8 on the one hand, and the speed difference determination values used by the determiner 29 on the other hand. As shown in FIG. 14, when the inclination angle of the road surface is larger than the set angle θa and the wheel speed of the idler wheels 7, 8 is lower than a set speed VA' (VA'>VA) during acceleration traveling, the determiner 29 changes the slip ratio determination value to a value (ΔVA') larger than the value used when the inclination angle is smaller than the set angle θa and the wheel speed of the idler wheels 7, 8 is lower than the set speed VA' (e.g., slip ratio determination value ΔVA for the flat road and downward slope). On the other hand, when the inclination angle of the road surface is smaller than the set angle θb and the wheel speed of the idler wheels 7, 8 is lower than a set speed VB' (VB'>VB) during deceleration traveling, the determiner 29 changes the slip ratio determination value to a value (ΔVB') smaller than the value used when the inclination angle is larger than the set angle θb and the wheel speed of the idler wheels 7, 8 is lower than the set speed VB' (e.g., slip ratio determination value ΔVB for the flat road and upward slope).

Even when the speed difference determination value is varied as described above, excessive slip control is also suppressed in the low-speed range. This makes it possible to reduce the acceleration time during acceleration traveling on the upward slope and reduce the braking distance during deceleration traveling on the downward slope while suppressing vibrations of the electrically driven vehicle.

With the above-described embodiments, it was shown that the slip ratio determination value or the speed difference determination value is selectively varied depending on whether the inclination angle is larger or smaller than the set angle θa (smaller or larger than the set angle θb). In an alternative structure, the magnitude of the slip ratio determination value or speed difference determination value may be varied in proportion to the magnitude of the inclination angle.

Figure 15:
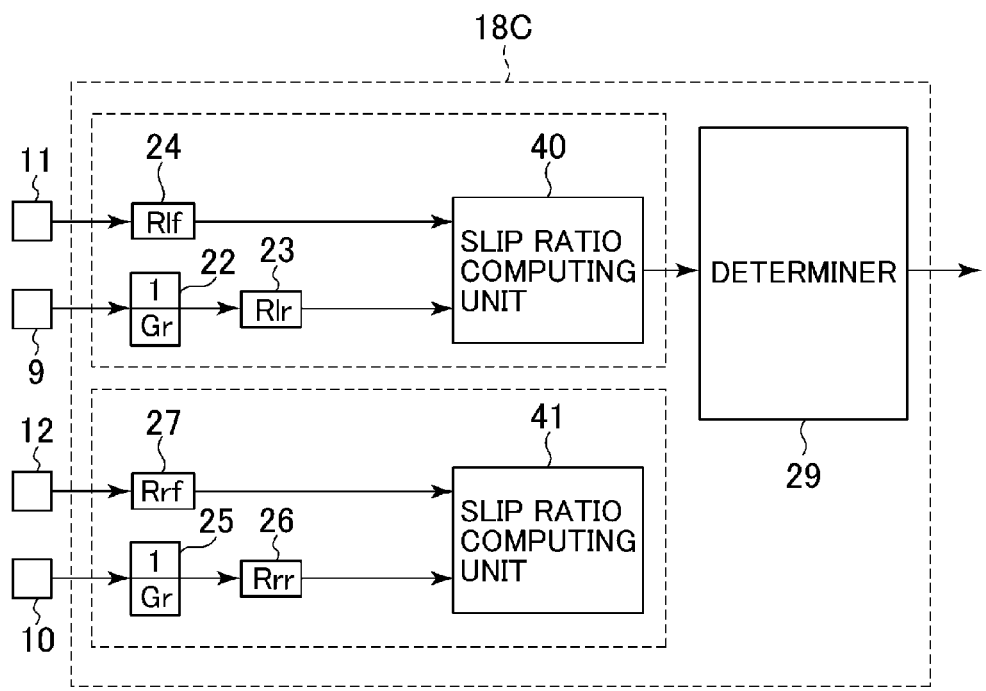
FIG. 15 is a block diagram of a variation 18C of the slip determiner in the first embodiment of the invention.

The embodiments above were explained on the assumption that as shown in FIG. 2, the slip ratio computing unit 28 or the speed difference computing unit 39 obtains the slip ratio or the speed difference by receiving the inputs of a mean value of the wheel speeds of the left and right idler wheels 7, 8 and a mean value of the wheel speeds of the left and right drive wheels 3, 6. In an alternative structure, as shown in FIG. 15, the vehicle may be equipped with a slip determiner 18C including a slip ratio computing unit 40 for the left wheels and a slip ratio computing unit 41 for the right wheels. The slip ratio computing units 40 and 41 may compute separate slip ratios by receiving the input of the wheel speeds of the left and right idler wheels 7, 8 and of the left and right drive wheels 3, 6, so as to control independently the torque of each of the left and right drive wheels 3, 6. This structure, when adopted, allows the slip ratio to be computed even if one of the speed detectors 9, 10 for the left wheels or one of the speed detectors 11, 12 for the right wheels has failed. Although FIG. 15 shows only the case where the slip ratios are computed, the wheel speed differences may obviously be computed in like manner, with similar advantageous effects.

DESCRIPTION OF REFERENCE NUMERALS 1, 4 Electric motor
3, 6 Drive wheel
7, 8 Idler wheel
9, 10, 11, 12 Speed detector
13 Power inverter
14, 15 Current detector
16 Torque controller
17 Torque command computing unit
18 Slip determiner
29 Determiner
19 Accelerator opening detector
20 Brake opening detector
21 Steering angle detector
22, 23, 24, 25, 26, 27, 37, 38 Gain
28, 40, 41 Slip ratio computing unit
30 Subtractor
31 Maximum value selector
32 Divider
33 Electric motor controller
34 Inclination sensor
35, 36 Adder
39 Speed difference computing unit
50 Instructing means

The invention claimed is:

1. An electrically driven vehicle equipped with drive wheels, idler wheels, electric motors for driving or braking said drive wheels, and electric motor controlling means for controlling said electric motors, said electrically driven vehicle comprising:
wheel speed detecting means for detecting the wheel speed of said drive wheels and that of said idler wheels;
computing means for computing the slip ratio of said drive wheels based on the wheel speed of said drive wheels and that of said idler wheels;
determining means for determining that said drive wheels are slipping if said slip ratio exceeds a slip ratio determination value; and
inclination detecting means for detecting the inclination angle of the road surface on which said electrically driven vehicle is traveling;
wherein, if said inclination angle is larger than a first set angle and if the wheel speed of said idler wheels is lower than a first set speed during acceleration traveling, then said determining means changes said slip ratio determination value to a larger value than the value used when said inclination angle is smaller than said set first angle and when the wheel speed of said idler wheels is lower than said first set speed; and
wherein under the condition that said inclination angle is smaller than said first set angle,
if the wheel speed of said idler wheels is higher than a second set speed, then said slip ratio determination value used by said determining means during acceleration traveling is set to a first determination value,
if the wheel speed of said idler wheels is lower than a third set speed set to be lower than said second set speed, then said slip ratio determination value is set to a second determination value larger than said first determination value, and
if the wheel speed of said idler wheels is lower than said second set speed and higher than said third set speed, then said slip ratio determination value is set to rise monotonically from said first determination value to said second determination value as the wheel speed of said idler wheels falls.

2. An electrically driven vehicle equipped with drive wheels, idler wheels, electric motors for driving or braking said drive wheels, and electric motor controlling means for controlling said electric motors, said electrically driven vehicle comprising:
wheel speed detecting means for detecting the wheel speed of said drive wheels and that of said idler wheels;
computing means for computing the slip ratio of said drive wheels based on the wheel speed of said drive wheels and that of said idler wheels;
determining means for determining that said drive wheels are slipping if said slip ratio exceeds a slip ratio determination value; and
inclination detecting means for detecting the inclination angle of the road surface on which said electrically driven vehicle is traveling;
wherein, if said inclination angle is larger than a first set angle and if the wheel speed of said idler wheels is lower than a first set speed during acceleration traveling, then said determining means changes said slip ratio determination value to a larger value than the value used when said inclination angle is smaller than said set first angle and when the wheel speed of said idler wheels is lower than said first set speed;
wherein, if the wheel speed of said idler wheels is higher than a fourth set speed, then said slip ratio determination value used by said determining means during deceleration traveling is set to a third determination value;

wherein, if the wheel speed of said idler wheels is smaller than a fifth set speed set to be smaller than said fourth set speed, the said slip ratio determination value is set to a fourth determination value smaller than said third determination value; and wherein, if the wheel speed of said idler wheels is lower than said fourth set speed and higher than said fifth set speed, then said slip ratio determination value is set to fall monotonically from said third determination value to said fourth determination value as the wheel speed of said idler wheels falls.

3. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing the slip ratio of said drive wheels based on the wheel speed of said drive wheels and that of said idler wheels;

determining means for determining that said drive wheels are slipping if said slip ratio exceeds a slip ratio determination value; and inclination detecting means for detecting the inclination angle of the road surface on which said electrically driven vehicle is traveling;

wherein, if said inclination angle is smaller than a first set angle and if the wheel speed of said idler wheels is lower than a first set speed during deceleration traveling, then said determining means changes said slip ratio determination value to a smaller value than the value used when said inclination angle is larger than said set first angle and when the wheel speed of said idler wheels is lower than said first set speed; and wherein, if the wheel speed of said idler wheels is higher than a second set speed, then said slip ratio determination value used by said determining means during acceleration traveling is set to a first determination value;

wherein, if the wheel speed of said idler wheels is lower than a third set speed set to be lower than said second set speed, then said slip ratio determination value is set to a second determination value larger than said first determination value; and wherein, if the wheel speed of said idler wheels is lower than said second set speed and higher than said third set speed, then said slip ratio determination value is set to rise monotonically from said first determination value to said second determination value as the wheel speed of said idler wheels falls.

4. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing the slip ratio of said drive wheels based on the wheel speed of said drive wheels and that of said idler wheels;

determining means for determining that said drive wheels are slipping if said slip ratio exceeds a slip ratio determination value; and inclination detecting means for detecting the inclination angle of the road surface on which said electrically driven vehicle is traveling;

wherein, if said inclination angle is smaller than a first set angle and if the wheel speed of said idler wheels is lower than a first set speed during deceleration traveling, then said determining means changes said slip ratio determination value to a smaller value than the value used when said inclination angle is larger than said set first angle and when the wheel speed of said idler wheels is lower than said first set speed; and wherein under the condition that said inclination angle is larger than said first set angle, if the wheel speed of said idler wheels is higher than a fourth set speed, then said slip ratio determination value used by said determining means during deceleration traveling is set to a third determination value, if the wheel speed of said idler wheels is smaller than a fifth set speed set to be smaller than said fourth set speed, the said slip ratio determination value is set to a fourth determination value smaller than said third determination value, and if the wheel speed of said idler wheels is lower than said fourth set speed and higher than said fifth set speed, then said slip ratio determination value is set to fall monotonically from said third determination value to said fourth determination value as the wheel speed of said idler wheels falls.

5. The electrically driven vehicle according to claim 1, 2, 3 or 4, further comprising instructing means for instructing said determining means to interrupt execution of slip control or to interrupt changing of said slip determination value.

6. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing a speed difference between the wheel speed of said drive wheels and that of said idler wheels;

determining means for determining that said drive wheels are slipping if said speed difference exceeds a speed difference determination value; and inclination detecting means for detecting the inclination angle of the road surface on which said electrically driven vehicle is traveling;

wherein, if said inclination angle is larger than a first set angle and if the wheel speed of said idler wheels is lower than a first set speed during acceleration traveling, then said determining means changes said speed difference determination value to a larger value than the value used when said inclination angle is smaller than said first set angle and when the wheel speed of said idler wheels is lower than said first set speed; and wherein under the condition that said inclination angle is smaller than said first set angle, if the wheel speed of said idler wheels is lower than a second set speed, then said speed difference determination value used by said determining means during acceleration traveling is set to a first determination value, and if the wheel speed of said idler wheels is higher than said second set speed, then said speed difference determination value is set to rise monotonically from said first determination value as the wheel speed of said idler wheels rises.

7. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing a speed difference between the wheel speed of said drive wheels and that of said idler wheels;

determining means for determining that said drive wheels are slipping if said speed difference exceeds a speed difference determination value; and inclination detecting means for detecting the inclination angle of the road surface on which said electrically driven vehicle is traveling;

wherein, if said inclination angle is larger than a first set angle and if the wheel speed of said idler wheels is lower than a first set speed during acceleration traveling, then said determining means changes said speed difference determination value to a larger value than the value used when said inclination angle is smaller than said first set angle and when the wheel speed of said idler wheels is lower than said first set speed;

wherein, if the wheel speed of said idler wheels is lower than a third set speed, then said speed difference determination value used by said determining means during deceleration traveling is set to a second determination value; and wherein, if the wheel speed of said idler wheels is higher than said third set speed, then said speed difference determination value is set to fall monotonically from said second determination value as the wheel speed of said idler wheels rises.

8. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing a speed difference between the wheel speed of said drive wheels and that of said idler wheels;

determining means for determining that said drive wheels are slipping if said speed difference exceeds a speed difference determination value; and inclination detecting means for detecting the inclination angle of the road surface on which said electrically driven vehicle is traveling;

wherein, if said inclination angle is smaller than a set angle and if the wheel speed of said idler wheels is lower than a first set speed during deceleration traveling, then said determining means changes said speed difference determination value to a smaller value than the value used when said inclination angle is larger than said set angle and when the wheel speed of said idler wheels is lower than said first set speed;

wherein, if the wheel speed of said idler wheels is lower than a second set speed, then said speed difference determination value used by said determining means during acceleration traveling is set to a first determination value; and wherein, if the wheel speed of said idler wheels is higher than said second set speed, then said speed difference determination value is set to rise monotonically from said first determination value as the wheel speed of said idler wheels rises.

9. An electrically driven vehicle equipped with drive wheels, idler wheels, electric motors for driving or braking said drive wheels, and electric motor controlling means for controlling said electric motors, said electrically driven vehicle comprising:

wheel speed detecting means for detecting the wheel speed of said drive wheels and that of said idler wheels;

computing means for computing a speed difference between the wheel speed of said drive wheels and that of said idler wheels;

determining means for determining that said drive wheels are slipping if said speed difference exceeds a speed difference determination value; and inclination detecting means for detecting the inclination angle of the road surface on which said electrically driven vehicle is traveling;

wherein, if said inclination angle is smaller than a set angle and if the wheel speed of said idler wheels is lower than a first set speed during deceleration traveling, then said determining means changes said speed difference determination value to a smaller value than the value used when said inclination angle is larger than said set angle and when the wheel speed of said idler wheels is lower than said first set speed; and wherein under the condition that said inclination angle is larger than said first set angle, if the wheel speed of said idler wheels is lower than a third set speed, then said speed difference determination value used by said determining means during deceleration traveling is set to a second determination value, and if the wheel speed of said idler wheels is higher than said third set speed, then said speed difference determination value is set to fall monotonically from said second determination value as the wheel speed of said idler wheels rises.

10. The electrically driven vehicle according to claim 6, 7, 8 or 9, further comprising instructing means for instructing said determining means to interrupt execution of slip control or to interrupt changing of said speed difference determination value.

* * * * *